United States Patent [19]

Peckels

[11] Patent Number: 5,044,521
[45] Date of Patent: Sep. 3, 1991

[54] VOLUMETRICALLY CONTROLLED DRINK DISPENSER

[76] Inventor: Arganius Peckels, Rte. 2 Box 489, Ogilvie, Minn. 56358

[21] Appl. No.: 477,553

[22] Filed: Feb. 9, 1990

[51] Int. Cl.⁵ .............................. B67D 5/06; B67D 5/35
[52] U.S. Cl. ........................................ 222/23; 222/39;
  222/477; 222/484; 222/500; 220/287; 215/329
[58] Field of Search .................. 222/42, 48, 442, 456,
  222/476, 477, 479, 500; 220/287; 215/329

[56] References Cited

U.S. PATENT DOCUMENTS

| | | | |
|---|---|---|---|
| 1,990,226 | 2/1935 | Eisemann et al. | 222/477 |
| 2,368,540 | 1/1945 | Goodman | 222/477 |
| 2,968,423 | 1/1961 | Mahler et al. | 222/500 |
| 3,083,872 | 4/1963 | Meshberg | 222/42 |
| 3,321,113 | 5/1967 | Conry | 222/477 |
| 3,543,964 | 12/1970 | Schlossmacher | 222/477 |
| 3,966,099 | 6/1976 | Sanford, Jr. et al. | 222/478 |
| 4,243,157 | 1/1981 | Rettberg | 222/500 |

Primary Examiner—Michael S. Huppert
Assistant Examiner—Kenneth Bomberg
Attorney, Agent, or Firm—D. L. Tschida

[57] ABSTRACT

Bottle mounted liquid metering apparatus including a helical fastener band self-adapting to a thread pitch. In alternative embodiments, collars rotatively supported relative to a pour tube and a plug portion control the size of a vent aperture and/or a fill window within the interior of the bottle along the pour tube and thereby the volume dispensed; a bottle vent integrally extends from the body of a threaded cap or a plug in radial relation thereto; and electronically timed annunciator means sequentially, uniformly meter a dispensed volume.

14 Claims, 6 Drawing Sheets

VOLUMETRICALLY CONTROLLED DRINK DISPENSER

BACKGROUND OF THE INVENTION

The present invention relates to liquid dispensers and, in particular, to a bottle mounted pour dispenser for liquors and the like.

Bottle mounted pour spouts have long been used in the bar and restaurant industry, as well as in the home, for dispensing liquors in a controlled fashion and with minimal spillage. In its simplest construction, such dispensers comprise a cork including a formed pour tube which is bent to facilitate pouring into a drink container. A vent in communication with a bottle interior and the atmosphere facilitates the pouring.

The bottle vent may merely comprise a hole through the body of the dispenser. More elaborate configurations may also be employed, such as in U.S. Pat. No. 3,966,099 wherein the bottle vent is integrally formed with a unitary plug body and pour spout and is hidden beneath a flange portion of the dispenser. Generally, however, the atmospheric vent must be positioned relative to the pour spout such that liquid is not inadvertently dispensed therefrom as liquid is dispensed from the pour spout.

Although facilitating pouring and minimizing spillage, the foregoing dispensers require the concentration of the bartender or other user to meter a particular amount of liquid. That is, the dispenser provides for no volumetric regulation, but rather depends upon the eye-hand coordination of the individual to control same.

In this latter regard, Applicant is also aware of a dispenser including means for alternatively metering a predetermined volume of liquid or serving as a free flow pourer, upon rotating the pour spout. Metering versions of such dispensers are sold under the brand name POSI-POUR and the construction of which is believed to be disclosed in U.S. Pat. No. 3,321,113.

Generally, such dispensers provide for a pour tube having one or more fill apertures formed in the body of the pour tube interiorly of the bottle and intermediate the outlet spout and a pour vent aperture, also formed in the tube wall. A first check ball mounted within the portion of the tube containing the fill and vent apertures moves to and fro relative to fore and aft valve seats to meter predetermined amounts of liquid, primarily depending upon the size of the pour vent aperture. Free-flow action is obtained by rotating the pour tube to position a detent for restraining the first ball and preventing sealing against the forward valve seat. A second captured ball member mounted aft of the pour vent aperture cooperates with a second valve seat to seal the aft end of the tube while dispensing each predetermined volume of liquid and otherwise facilitating draining of the pour tube.

One drawback to the foregoing dispensers is that with each metering operation, the operator must rock the bottle back and forth to cause the ball members to evacuate the tube and then re-fill the tube with the next dispensing operation. Such extraneous movements can become aggravating, as well as irritating, due to the audible clicking of the balls within the dispenser. Another drawback is that, other than a predetermined volume and free flow, the dispensers do not permit a selectively variable adjustment of the volume.

A further shortcoming of such dispensers is that for screw collar mounting versions, the collars do not adjust for the varieties thread spacings and pitches commonly encountered. This further complicates the selection process and cost to the user by requiring a larger collection of pourers to accommodate the various different types of bottles.

SUMMARY OF THE INVENTION

Accordingly, it is a primary object of the present invention to provide a dispenser which permits the user to selectively pre-set the volume of liquid to be dispensed, without the necessity of maintaining numerous dispensers.

It is a further object of the invention to provide a dispenser including a threaded collar which is adaptable to bottles having varieties of thread, sizes, spacings and pitches.

In one construction of the invention, it is a still further object to provide for a dispenser which permits the user to dispense identical, metered volumes of liquid, without having to alternately rock the bottle back-and-forth between each dispensing operation.

It is a yet further object of the invention to provide a dispenser wherein an atmospheric vent is formed within an outermost plug and/or in alignment with a channeled cover portion of the dispenser.

It is a yet further object of the invention to provide for user selectable control assemblies for variously determining the liquid volumes dispensed.

Various of the foregoing objects, advantages and distinctions of the invention are achieved in alternative constructions which are more particularly described hereinafter. In one such construction, the dispenser includes a pour tube having a collar rotatably mounted thereto which includes a plurality of differently sized apertures that can be aligned with a vent aperture to the bore of the pour tube and whereby the user may select a desired volume. In another alternative construction, the collar includes a shutter which is rotatively mounted relative to one or more pour tube fill windows or apertures to selectively control the gross deliverable volume. Multiple collar sections may also be combined to simultaneously rotate relative to each of the pour tube fill and vent apertures to obtain a desired range of dispensable volume.

In another construction of the invention, a threaded cap includes a flexible, band member which is frustroconically positioned in a pourer collar and which exhibits opposite lateral edges of differing heights. The member is resiliently restrained to the collar with the relatively shorter one of the lateral edges positioned to capture and follow the threads of a bottle, independent of pitch and spacing and/or size of the threads. Thus, a variety of different thread, sizes, spacings and pitches are accommodated with a single cap assembly In the above constructions, an atmospheric bottle vent is integrally formed with the collar plug and cap that supports the pour tube. The outlet port of the vent is alternatively positioned to align with a channelway in a flange portion of the pour tube or to extend to a radial surface of the plug cap.

In yet another construction of the invention, the dispenser includes timer means, switch means for actuating the timer means upon tilting the bottle, and a cooperating annunciator, whereby the user may continuously pour identical volumes of liquid as determined by the frequency of annunciation. In one particular construction, a battery powered timer means, including switch means synchronized to the filling of the pour tube and the dispensing of liquid, sequentially measures predetermined periods and illuminates a light emitting diode (LED) at the end of each period. The user, in turn, moves the pourer into alignment with separate glasses. The timer period may also be selectively set with the addition of selector means.

Still other objects, advantages and distinctions of the invention as well as various alternative combinational configurations will become more apparent hereinafter upon directing attention to the following description with respect to the appended drawings. Before referring thereto, it is to be appreciated the following description is illustrative only of the presently preferred forms of the invention and should not be interpreted in strict limitation thereof. Rather, the invention should be interpreted within the spirit and scope of the following claims. To the extent also that modifications or improvements have been considered, they are described as appropriate.

DESCRIPTION OF THE PREFERRED EMBODIMENT

Figure 1:
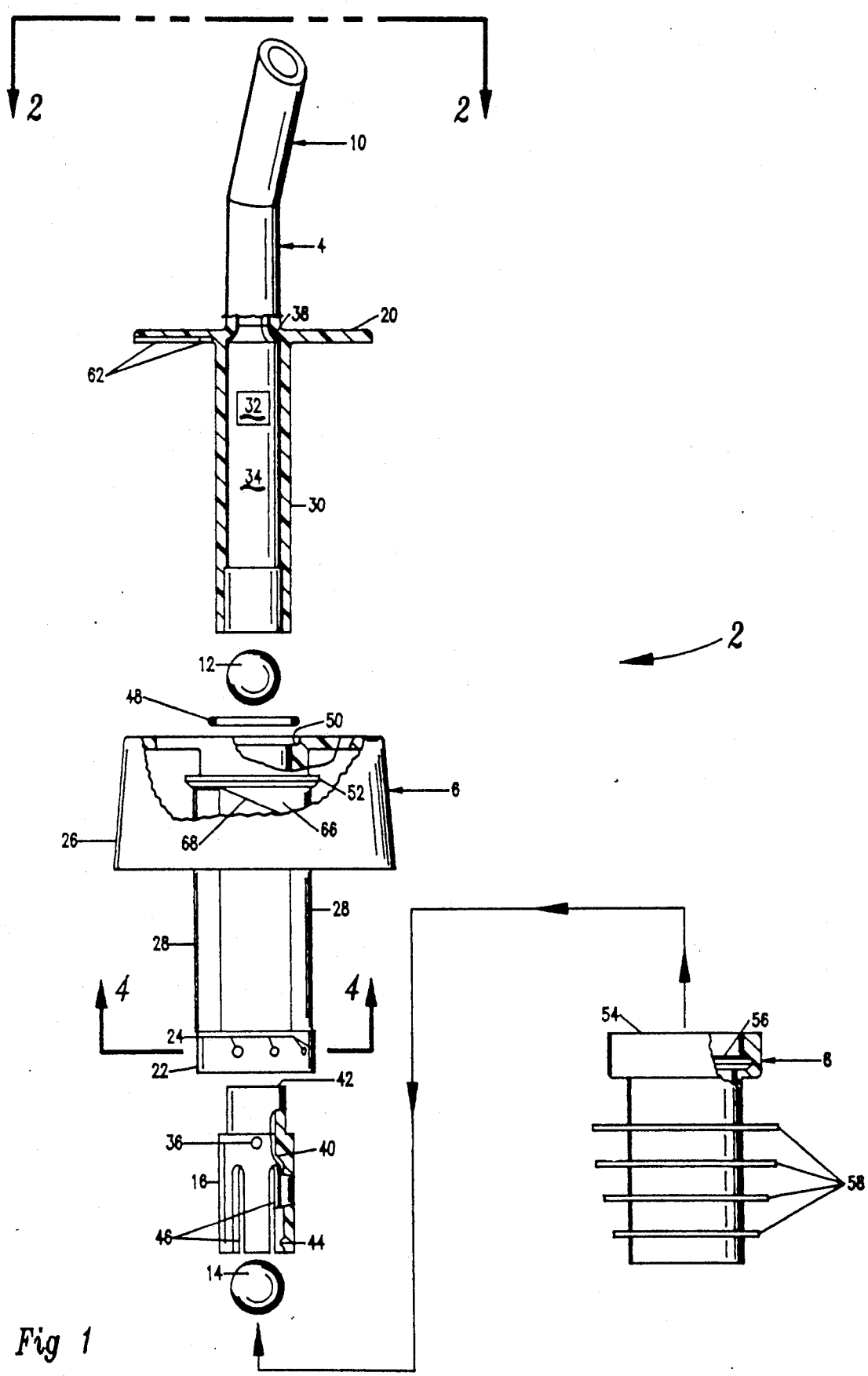
FIG. 1 shows an exploded assembly drawing of a plug-type dispenser including a rotatable vent aperture and fill window collar.

Referring to FIG. 1, an exploded assembly drawing is shown of a liquid pour dispenser 2 of the present invention. The dispenser 2 is typically mounted to a liquor bottle (such as shown at 70 in FIG. 5) for dispensing metered amounts of liquid into drink containers. In contrast to other known dispensers, the dispenser 2 provides for a nozzle assembly 4 which relative to a rotatable nozzle support or collar 6 and bottle securing plug 8 permits the user to selectively establish of a volumetrically calibrated amount of liquor for delivery.

Figure 2:
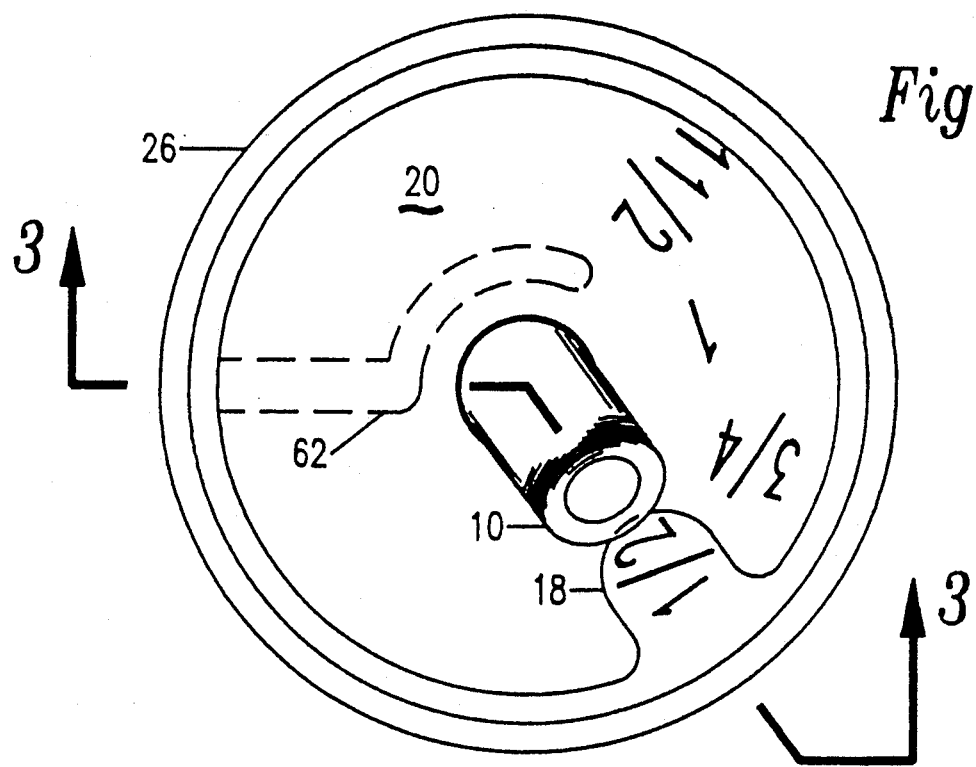
FIG. 2 shows a top plan drawing of the pour spout of FIG. 1 taken along reference line 2—2.
Figure 4:
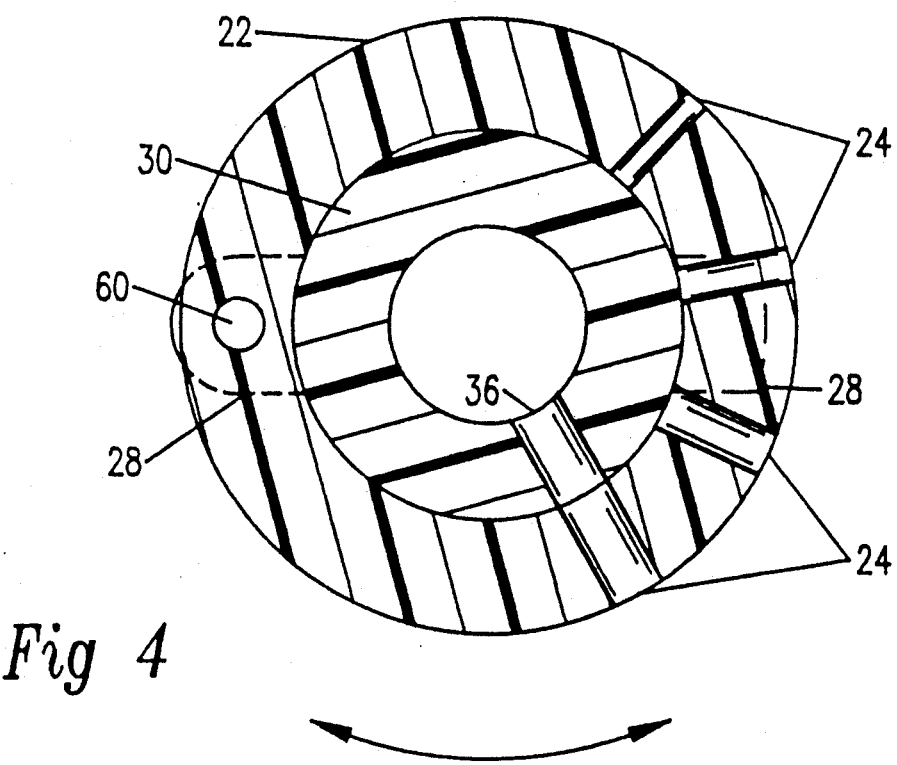
FIG. 4 shows a cross section view taken along section lines 4—4 of FIG. 1 through the pour tube vent collar.

That is and with additional attention to FIGS. 2 and 4, upon rotating the annular support collar 6 relative to the nozzle assembly 4—which comprises a pour spout 10, pour tube 30, ball checks 12 and 14 and aft ball cage 16—and plug 8, one of a plurality of radially disposed registration indices may be brought into alignment with a window 18 of a pour tube flange 20 which mounts above the collar 6. Preferably, the dispenser 2 can be adjusted to deliver volumes of $\frac{1}{2}$, $\frac{3}{4}$, 1 or $1\frac{1}{2}$ ounces. However, other volumes could be delivered upon appropriately adjusting the below described structure of the dispenser 2.

In the latter regard, an annular collar 22 which includes a plurality of apertures 24 of different sizes is secured to a hand rotatable portion 26 of the collar 6 via a pair of struts 28. The struts 28 support the collar 22 and apertures 24 in concentric alignment to a lower end of the pour tube 30 which extends interiorly of the bottle. In particular, the collar 22 is aligned with a vent aperture 36 in the ball cage 16.

Otherwise, as seen from the cross section view of the pour tube portion 30, one of a pair of oppositely positioned fill apertures or windows 32 are provided at the upper end of the tube 30 and admitted to a bore cavity interiorly of the pour tube 30. The specific volume of liquid admitted to the cavity 34 is controlled via the relative cross sectional area of the fill apertures 32 relative to the vent aperture 36 which again is provided at the ball cage 16 and lower end of the pour tube 30.

It is with respect to the vent aperture 36 that the apertures 24 of the collar 22 are aligned as the hand collar 26 is rotated. This alignment process can more particularly be seen with respect to FIG. 4 and wherein a cross section view taken along section lines 4—4 through the collar 22 is shown. The positioning of each of the apertures 24 corresponds to one of the indices embossed into the top of the hand collar 26. Thus, upon aligning a selected index with the window 18 in the pour spout flange, the user is assured of an appropriate combinational aperture, comprised of the apertures 24 and 36, to effect the delivery of the indicated volume of liquid. Accordingly, the largest of the apertures 24 would normally be sized to correspond to that of the aperture 36, with each successive aperture 24 being sequentially smaller.

Figure 3:
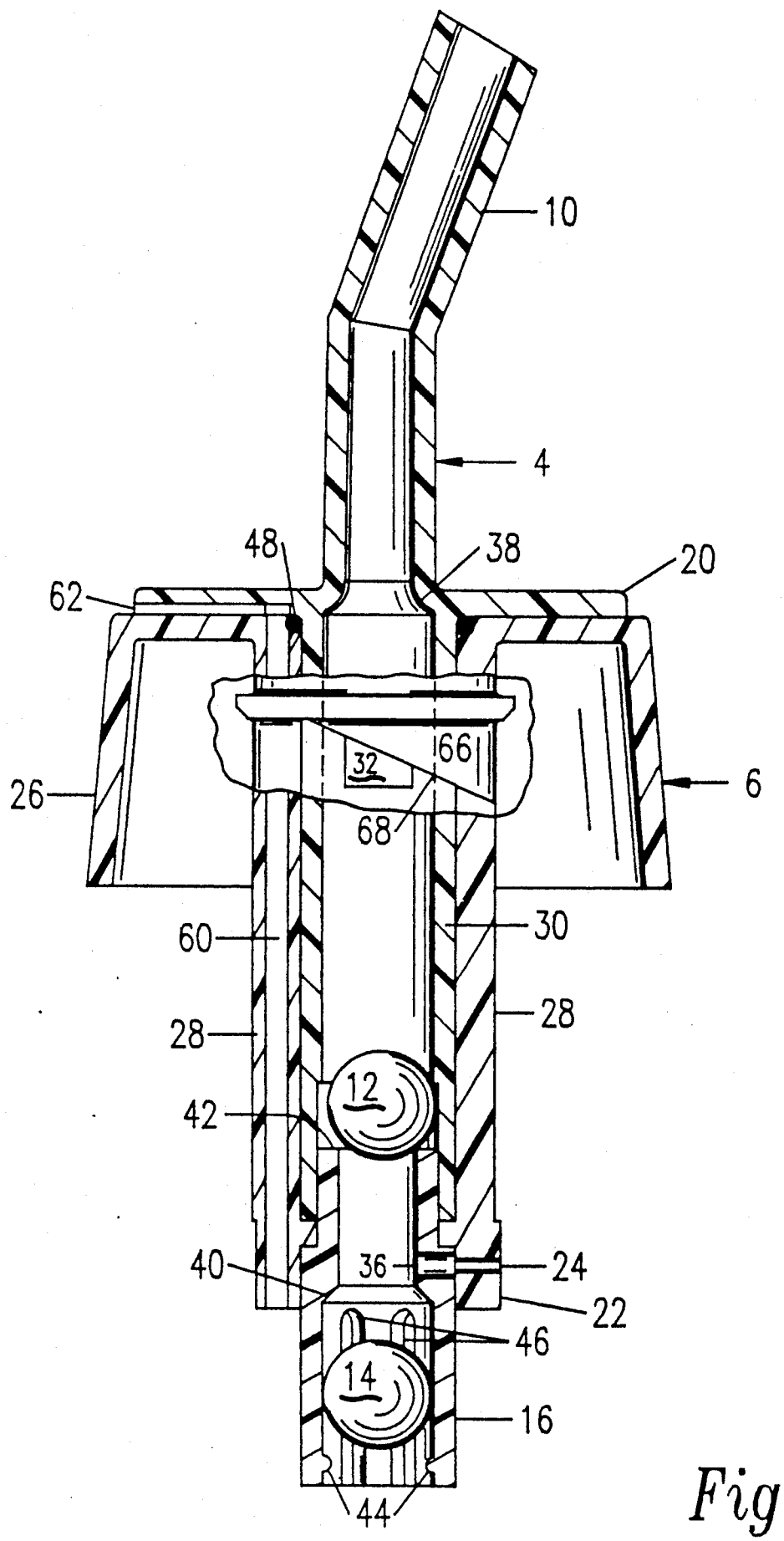
FIG. 3 shows a cross-section view taken along section lines 3—3 of FIG. 2 of an assembled dispenser of FIG. 1 independent of and rotatively mounted relative to the dispenser pour tube.

Referring also to FIG. 3 and cooperating with the operation of the collar 26 and the proportional sizing of the vent 36 relative to the fill windows 32 is the action of the check balls 12 and 14. The balls 12, 14 appropriately engage ball seats 38 and 40 formed interiorly at the fore end of the bore cavity 34 and at the fore end of the ball cage 16. The aft travel of the check balls 12, 14 is, in turn, constrained at a seat 42 that occurs between the ball 12 and the fore-end of the ball cage 16 and at an annular ridged projection or stop 44 which extends interiorly of the aft end of the ball cage 16. In combination, the movement of the balls determines the volume dispensed between alternate seatings of the balls. In particular, the forward movement of the check ball 12 relative to the seat 38 controls the gross volume of liquid dispensed, as determined by the cooperation between the pour tube vent apertures 24 and 36 and fill windows 32, and presuming that the check ball 14 seals against the seat 40. Otherwise, the rearward motion of the check balls 12, 14 relative to the seat 42 and annular stop 44 facilitates the evacuation of residual liquid within the pour tube cavity 34, which is allowed to escape via a plurality of slots 46 formed within the walls of ball cage 16.

Before directing attention to the bottle vent assembly included with the dispenser 2, it is to be appreciated that the sizing of the pour tube 30 is determined such that the pour tube 30 concentrically mounts with sufficient spacing relative to the struts 28 and collar 24 to permit free rotation of the collar 6 thereabout. Leakage is prevented between the nozzle 4 and collar 6 via an O'ring 48 which mounts within a seat 50, shown in the cutaway portion of the hand collar 26 in FIG. 1.

Otherwise leakage between the collar 6 and the plug 8 is prevented via an annular ring 52 which projects outwardly from the upper end of the struts 28 and which is engagable with a mating recess 56 formed within the upper end portion 54 of the plug 8. The ring projection 52 and mating recess 56 are sized relative to one another such that the plug end 54 may snap mount thereover, yet the ring 52 can be rotated within the recess 56. Thus, leakage is prevented via a double sealing action between the projection 52 and recess 56 and the O'ring 48 at the recess 50. In passing, it is also to be noted that the plug 8 provides a plurality of flexible annular projections of successively decreasing radius, from the upper to the lower end of the plug 8, which resiliently grasp the interior of a bottle, when forced therein.

With further attention directed to FIG. 3, along with FIG. 2 and the nozzle 4 of FIG. 1, it is to be noted that a vertical bore 60 is provided through the interior of the left most strut 28 and extends from the bottom of the collar 22 through the top of the hand collar 26. The bore 60 provides for a necessary atmospheric bottle vent. As to be noted from the lower, left surface of the flange 20 of FIGS. 1 and 3 and the dotted line portion of FIG. 2, a channelway 62 is formed within the flange 20 that aligns with the upper end of the bore 60. The channelway 62, in turn, arcuately extends over the range of the hand collar rotation such that the bottle is vented over the complete range of travel of the hand collar 26 relative to the volume indices and apertures 24. That is, the channelway 62 provides a recess wherethrough air is admitted from the atmosphere to the bottle interior over this path of travel.

Otherwise the bottom surface of the flange 20 essentially closes off the upper end of the bore 60. Thus, pouring action is effectively restricted over all other regions of rotation of the hand collar 26, since proper airflow is not achievable within the bottle interior to assure a calibrated pouring action. It is to be appreciated, however, that a free pour position might be effected by appropriately extending the channelway 62 to a position whereat the window 18 is juxtapositioned relative to the vent bore 60 and detent means (not shown, but such as disclosed in the earlier mentioned U.S. Pat. No. 3,321,113), whereby the travel of the forward check ball 12 is restrained and not permitted to abut the seat 38.

Appreciating that the volume dispensed is dependent not only upon the size of the vent aperture 36, but also the combined area of the fill windows 32, in lieu of a vent covering collar 22 or in combination therewith, FIGS. 1 and 3 each show a further ramped, shutter-acting collar 66 which extends between the struts 28 and which can be rotated with the hand collar 26 to selectively cover portions of one or more of the fill windows 32.

In particular, the shutter collar 66 provides for an angular edge 68 which over its range of rotation variably covers the window to control the amount of liquid that is admitted to the pour tube cavity 34. Depending upon the range of the gross volume to be dispensed and the desired selectivity, it is to be appreciated that the addition of a shutter collar 66 or use by itself in lieu of the vent aperture collar 22 provides enhanced volumetric control. For smaller volumes it is believed, however, that the collar 22 provides adequate control.

Figure 5:
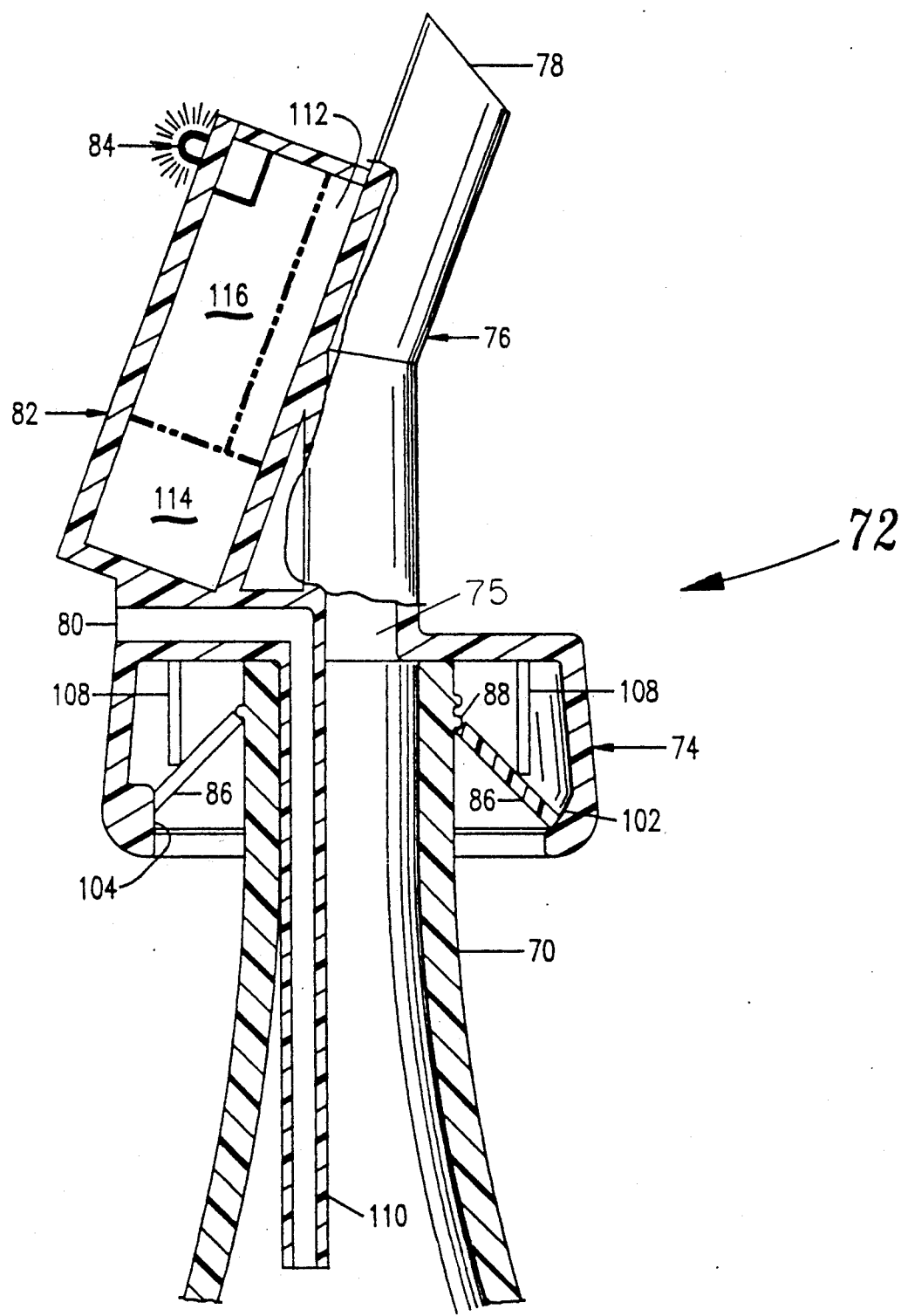
FIG. 5 shows a cross section view in partial cutaway of an electronic pour controller including a collar having variable band fasteners.

Turning attention next to FIG. 5, a drawing of an alternative electronically controlled pour dispenser 72 is shown in partial cutaway relative to a portion of a threaded bottle 70. For this embodiment, the bottle securing portion of the dispenser 74 comprises a threaded cap or collar 74 which variably adjusts to the thread pattern of the bottle 70. An integrally formed nozzle 76 having a center bore 75 projects from the cap 74. Extending from the side of the nozzle 76 opposite a pour spout 78 is an atmospheric vent bore 80 and an electronics module 82, which includes a light emitting diode (LED) 84. The details of the module 82 and its operation will be described below.

Figure 6:
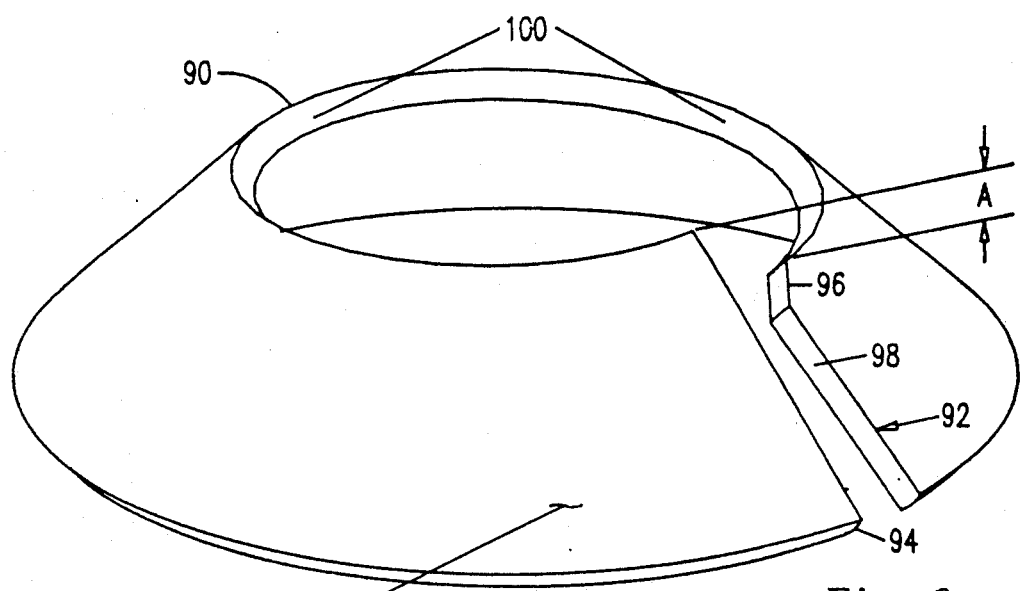
FIG. 6 shows an isometric view of the band fastener of FIG. 5 removed from the cap.
Figure 9:
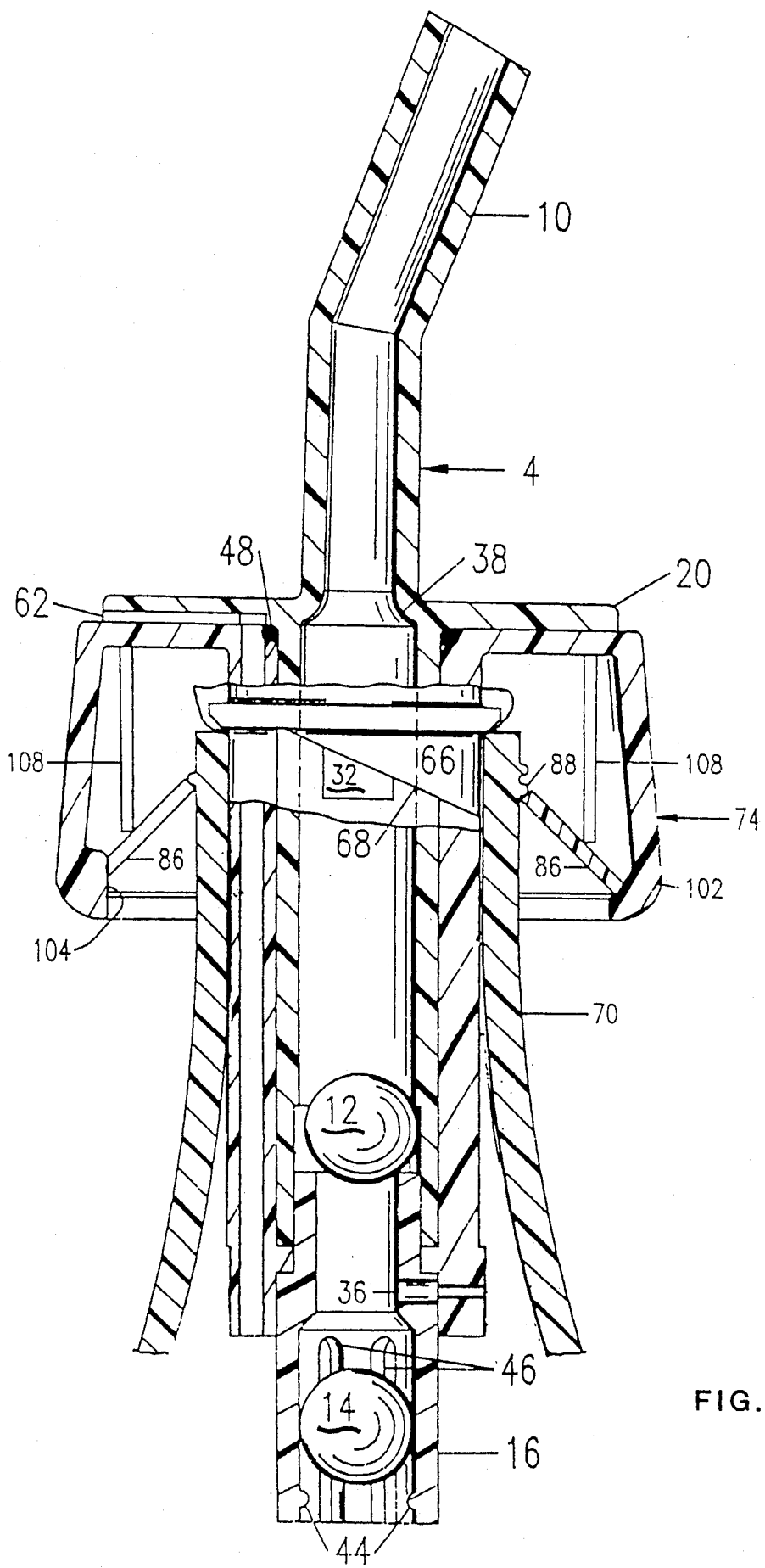
FIG. 9 shows a cross section view in partial cutaway of a dispenser like that of FIG. 1 including a band fastener like that of FIG. 5.

Referring first however to the cap 74 and with additional attention to FIGS. 6 and 9, the cap 74 is formed to resiliently support a flexible band 86 in conical relation within the cap 74 such that its upper edge grasps and follows spirally formed bottle threads 88. The band 88 is particularly able to grasp the threads over a wide range of thread, sizes, spacings and pitches.

With additional attention to FIG. 6, the band 86 generally comprises a flattened resilient strip of plastic, which may be formed of a single material or may be coated with a slippery material such as TEFLON or the like, so as not to bind while following the threads 88. The upper horizontal edge 90 is cut such that one of the vertical, lateral edges 92 is shorter than the adjacent vertical edge 94, as denoted by the height differential "A". The edge 92, which leads rotation, includes a cut or bent corner 96 to facilitate grasping of the bottle threads 88 and the starting of the cap thereto. The edge 92 may also be formed to provide a knife-like or tapered edge surface 98 to further facilitate locating and containment to the threads 88. Otherwise, the upper horizontal edge 90 tapers as it extends between the lateral edges 92, 94 to form a helical edge shape when bent to the shape shown in FIG. 6. The lower horizontal edge is straight.

Upon positioning the band 86 in the cap 74, it assumes a frustro conical mounting relation within the cap 74, with the corner 96, radiating slightly interiorly. This mounting position is assured via an annular lip 102 which extends about the bottom edge of the cap 74. A vertical stop or rib 104 also projects interiorly of the cap 74 to restrain the rotation of the band 86 as the corner of the edge 94, as the cap 74 is screwed onto a bottle 70. One or more legs or annular rings 108 may also project downward from the upper interior surface of the cap 74 to contact the band 86 along its flat surface to facilitate the maintenance of its conical shape.

Regardless of the thread size, spacing and pitch of the bottle, the corner 96 of the lateral edge 92 and the horizontal edge 90 tends to align and follow the bottle threads 88 as the cap 74 is rotated to form a threaded bond therewith. Eventually, the band 86 tightens to the point where the band 86 slightly flexes and the edge 90 deforms relative to the threads 88 to seal one to the other.

Radially projecting from the top and positioned beneath the electronics module 82 of the cap 74 is the vent bore 80. The bore 80 extends inwardly to the nozzle bore 75 where it bends and continues downward at a stem portion 110 of the cap 74 that mounts interiorly of the bottle.

Turning attention next to the electronics module 82, it functions to periodically annunciate the delivery of identical volumes of liquid, presuming the nozzle 76 remains full. It finds particular advantage in a continuous pour dispenser, since it permits the user to measure uniform volumes without having to rock the bottle 70 back-and-forth, as with the dispensers 2.

Specifically, the module 82 includes a switch 112, such as a mercury switch, which enables the delivery of power from a battery 114 to an electronic timer 116, upon rotating the bottle to a pour position. Once initiated, the timer 116 times a predetermined period, which may be selectively established. Upon timing out, the timer 114 provides a control signal to the annunciator or LED 84 which is enabled to advise the user that a predetermined volume of liquid has been poured. The user then moves the dispenser into alignment with the next beverage glass.

At present, the dispenser 72 provides for an LED annunciator 84 which operates relative to a fixed period timer 116. This combination provides a very high repeat accuracy from drink to drink. An audible annunciator might also be included to replace or in combination with the LED 84. Still further, a presettable timer 116 could be employed and wherein the user could set the period relative to a calibrated selector to provide a known delivery range. For example, a variable resistor or digital switch assembly could be used to establish the time period relative to the timer means 116. The timer means, in turn, can comprise any of a variety of battery powered digital circuits, such as are formed from delay lines, counters, presettable registers and the like.

Figure 8:
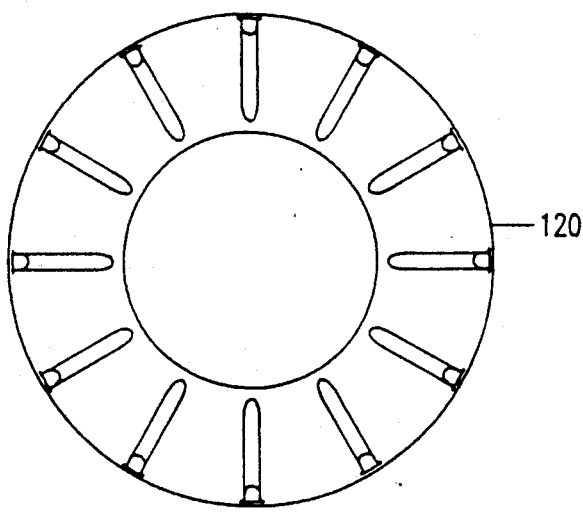
FIG. 8 shows a top plan drawing of the cover of FIG. 7.
Figure 7:
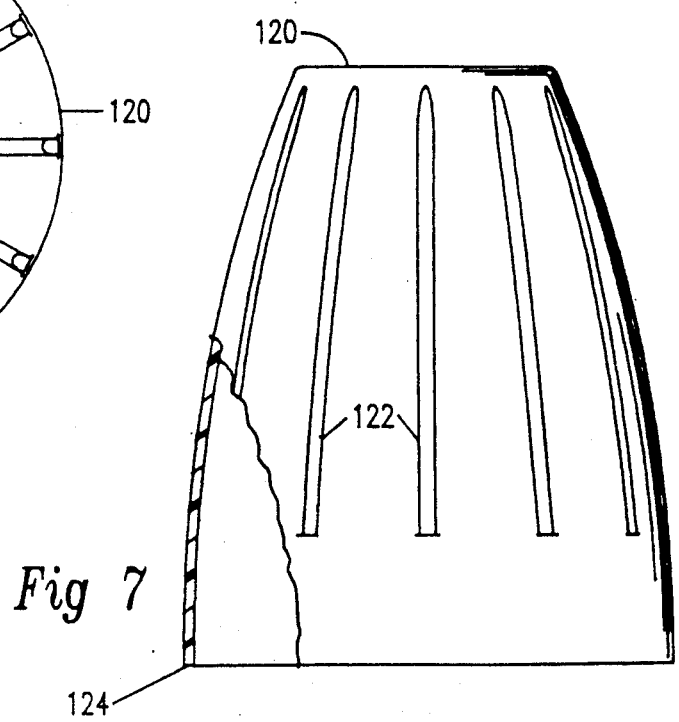
FIG. 7 shows a side plan drawing in partial cutaway of a dispenser cover.

Lastly, FIGS. 7 and 8 disclose a dust cap 120 which can be mounted over the dispensers 2 and 72, when not in use. The cap 120 includes a plurality of projecting ridges or slots 122 which facilitate gripping by the hand during mounting/removal. Otherwise, the lower edge 124 is formed to snap mount to the outer periphery of the cap 74 and 26. For the cap 74, a slot (not shown) permits alignment with and mounting over the electronics module 82.

While the invention has been described with respect to various alternative considered constructions, it is to be appreciated that still other constructions and modifications thereto may suggest themselves to those of skill in the art. One such modification might comprise the combination of the threaded cap 74 with the collar 26 or the modification of the dispenser 2 such that the nozzle 4 rotates relative to a fixed collar 26. Alternatively, too, the collars 22 and 66 might be used independent of each other. Accordingly, it is contemplated that the following claims should be interpreted to include all those equivalent embodiments within the spirit and scope thereof.

What is claimed is:

1. Liquid metering apparatus for a liquid containing bottle comprising:
   a. nozzle means having a bore in communication with the bottle interior for dispensing liquid through said bore; and
   b. means for forming a liquid tight seal between said nozzle means and said bottle wherein said seal means includes a cap having sidewalls and an annular top wall and further includes a discontinuous flat band having first and second lateral edges of differing lengths extending between a bottom and a top edge and positioned in concentric, frusto-conical relation to the interior of said sidewalls such that the shorter of the first and second lateral edges and said top edge are rotatively engageable with threads projecting from said bottle and such that said band resiliently flexes at a point of rotation to compressively seal against said bottle.

2. Apparatus as set forth in claim 1 wherein said nozzle means includes a vent aperture to the bore opening through a sidewall from the bottle interior and a liquid volume defining means comprised of an annular collar including a plurality of apertures of differing areas and wherein said nozzle means includes means coupled to said collar for rotatively positioning said collar and each of said plurality of apertures in alignment with said vent aperture.

3. Apparatus as set forth in claim 2 wherein said collar positioning means includes a vent bore in communication with the atmosphere and the interior of said bottle.

4. Apparatus as set forth in claim 3 wherein said nozzle means includes an annular flange which mounts in covering relation to a portion of an upper surface of the cap and which includes a radially extending channelway in communication with an upper end of an vent bore through the cap and wherein said channelway is exposed to the atmosphere.

5. Apparatus as set forth in claim 2 wherein said nozzle means includes first and second check balls mounted within a tubular member defining the bore and in liquid sealing relation to at least first and second annular valve seats, wherein said first and second valve seats are respectively positioned forward of a fill aperture opening through a sidewall of said tubular member and in communication with said bore and the bottle interior and aft of said vent aperture and wherein said vent aperture is aft of said fill aperture.

6. Apparatus as set forth in claim 2 wherein said nozzle means includes at least one exposed fill aperture opening through a sidewall of a tubular member and in communication with said bore and the bottle interior and wherein the fill aperture is positioned forward of said vent aperture and further including means for selectively varying the exposure of said fill aperture.

7. Apparatus as set forth in claim 6 wherein said fill aperture exposure varying means includes a second annular collar having an edge portion aligning with said fill aperture to selectively vary the exposure of said fill aperture as said second collar is rotated.

8. Apparatus as forth in claim 1 wherein said cap includes a stop projection extending from an interior sidewall surface to engage the longer of said first and second lateral edges to restrain the band from rotating in said cap.

9. Apparatus as forth in claim 8 wherein said cap includes a radiused lip at a periphery of an open bottom end and further includes at least one member projecting from said top wall to support a portion of said band.

10. Apparatus as forth in claim 1 wherein said cap includes a tubular vent portion comprising a second bore and wherein said vent portion mounts interiorly of said bottle such that said second bore is in communication with the atmosphere and the interior of the bottle.

11. Liquid metering apparatus for a liquid containing bottle comprising:
   a. nozzle means including a tubular member having a bore in communication with the bottle interior for dispensing liquid through said bore, wherein said tubular member includes an exposed fill aperture in communication with the bottle interior and opening through a sidewall of said tubular member to said bore;

b. means for forming a liquid tight seal between said nozzle means and said bottle wherein said seal means includes a cap having sidewall and an annular top wall and further includes a discontinuous flat band having first and second lateral edges of differing lengths extending between a bottom and a top edge and positioned in concentric, frusto-conical relation to the interior of said sidewalls such that the shorter of the first and second lateral edges and said top edge are rotatively engageable with threads projecting from said bottle and such that said band resiliently flexes at a point of rotation to compressively seal against said bottle; and c. means for selectively varying the exposure of said fill aperture and thereby defining a repetitively deliverable liquid volume.

12. Liquid metering apparatus for a liquid containing bottle comprising:
   a. nozzle means includes a bore in communication with the bottle interior for dispensing liquid through said bore;
   b. battery means;
   c. timing means for producing a periodic control signal of a predetermined duration;
   d. switch means for coupling said battery means to said timing means upon filling said bore;
   e. annunciator means responsive to said periodic control signal for indicating the dispensing of uniformly identical volumes of liquid with the occurrence of each control signal, and whereby a user can dispense measured volumes of liquid without interrupting the liquid delivered to said bore; and
   f. means for forming a liquid that seal between the nozzle means and said bottle including a cap having sidewalls and an annular top wall and further including a discontinuous flat band having first and second lateral edges of differing lengths extending between a bottom and a top edge and positioned in concentric, frusto-conical relation to the interior of said sidewalls such that the shorter of the first and second lateral edges and said top edge are rotatively engageable with threads projecting from said bottle and such that said band resiliently flexes at a point of rotation to compressively seal against said bottle 13. Apparatus as forth in claim 12 wherein said annunciator comprises a light emitting diode and said metering means includes means for selectively varying the period of said timer means.

14. Liquid metering apparatus for a liquid containing bottle comprising:
   a. nozzle means including a tubular member having a bore in communication with the bottle interior for dispensing liquid through said bore, wherein said tubular member includes a first vent aperture opening through a sidewall to said bore from the bottle interior, a second vent aperture in communication with the atmosphere and bottle interior and further including at least one fill aperture opening through a sidewall of said tubular member in communication with said bore and the bottle interior and positioned forward of said first vent aperture and wherethrough the liquid enters the bore;
   b. first means including a first collar concentrically mounted in relation to the tubular member and rotationally operative along a radial axis for selectively varying the exposure of said fill aperture;
   c. second means including a second collar concentrically mounted in relation to the tubular member and rotationally operable along a radial axis for selectively varying the exposure of said first vent aperture and whereby the first and second means define a repetitively deliverable liquid volume; and
   d. means for forming a liquid tight seal between said nozzle means and said bottle.

* * * * *